(12) United States Patent
Sharma et al.

(10) Patent No.: US 10,091,008 B2
(45) Date of Patent: Oct. 2, 2018

(54) METHOD AND APPARATUS FOR PERFORMING CREDIT RESERVATIONS FOR ONLINE CHARGING IN A COMMUNICATION NETWORK

(71) Applicant: Telefonaktiebolaget LM Ericsson (publ), Stockholm (SE)

(72) Inventors: Nipun Sharma, New Delhi (IN); Robert Törnkvist, Karlshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/554,576

(22) PCT Filed: May 22, 2015

(86) PCT No.: PCT/IN2015/050038
§ 371 (c)(1),
(2) Date: Aug. 30, 2017

(87) PCT Pub. No.: WO2016/151598
PCT Pub. Date: Sep. 29, 2016

(65) Prior Publication Data
US 2018/0097644 A1  Apr. 5, 2018

(30) Foreign Application Priority Data

Mar. 20, 2015  (IN) .............................. 766/DEL/2015

(51) Int. Cl.
*H04L 12/14* (2006.01)
*H04L 29/08* (2006.01)
(Continued)

(52) U.S. Cl.
CPC ...... *H04L 12/1457* (2013.01); *H04L 12/1435* (2013.01); *H04L 12/1467* (2013.01);
(Continued)

(58) Field of Classification Search
CPC ... H04L 41/5029; H04L 47/14; H04L 47/822; H04L 41/5022; H04L 47/20;
(Continued)

(56) References Cited

U.S. PATENT DOCUMENTS

2009/0319412 A1* 12/2009 Karlsson ................ G06Q 40/00 705/35
2011/0125509 A1*  5/2011 Lidstrom ............... G06Q 30/02 705/1.1
2012/0157041 A1   6/2012 Cai et al.

FOREIGN PATENT DOCUMENTS

WO      2009/145785       12/2009
WO  WO 2010/027356 A1     3/2010
(Continued)

OTHER PUBLICATIONS

International Search Report and Written Opinion of the International Searching Authority, International Application No. PCT/IN2015/050038, dated Feb. 15, 2016, 8 pages.
(Continued)

*Primary Examiner* — Kwasi Karikari
(74) *Attorney, Agent, or Firm* — Sage Patent Group

(57) ABSTRACT

A method and apparatus advantageously consider historic usage data in determining the credit reservations made against subscriber accounts during online charging operations. In particular, with respect to a communication between first and second parties that is subject to online charging, the method and apparatus use historic usage data associated with at least one of the first and second parties, to determine credit reservations against an involved subscriber account. This approach makes the credit reservation better reflect the usage pattern or history of one or both parties. In some embodiments, the historic usage data is generalized with respect to the called or contacted party. In other embodiments, the historic usage data is generalized with
(Continued)

respect to the calling or contacting party. In still other embodiments, the historic usage data is particularized to reflect a historic usage pattern of communication between the first and second parties.

23 Claims, 10 Drawing Sheets

(51) Int. Cl.
*H04W 4/26* (2009.01)
*H04W 4/24* (2018.01)

(52) U.S. Cl.
CPC .............. *H04L 67/306* (2013.01); *H04W 4/24* (2013.01); *H04W 4/26* (2013.01)

(58) Field of Classification Search
CPC ...... H04M 15/66; H04M 15/41; H04M 15/43; H04M 15/44; G06Q 20/14; G06Q 30/0202; G06Q 10/0631; G06Q 20/401
See application file for complete search history.

(56) References Cited

FOREIGN PATENT DOCUMENTS

WO      2013/100829         7/2013
WO      WO 2014/108801 A1   7/2014

OTHER PUBLICATIONS

3GPP TS 32.299, V10.4.0 (Dec. 2011) (XP050555070) 3rd Generation Partnership Project (3GPP) Technical Specification Group Services and System Aspects; Telecommunication Management; Charging Management; Diameter Charging Applications (Release 10), 149 pages.

Extended European Search Report dated Feb. 5, 2018 in corresponding European Patent Application No. 15886171.6, 7 pages.

* cited by examiner

METHOD AND APPARATUS FOR PERFORMING CREDIT RESERVATIONS FOR ONLINE CHARGING IN A COMMUNICATION NETWORK

CROSS REFERENCE TO RELATED APPLICATIONS

This application is a 35 U.S.C. § 371 national stage application of PCT International Application No. PCT/IN2015/050038, filed on May 22, 2015, which in turns claims foreign priority to Indian Utility Patent Application No. 766/DEL/2015, filed on Mar. 20, 2015, the disclosures and content of which are incorporated by reference herein in their entirety.

TECHNICAL FIELD

The present invention generally relates to communication networks, and particularly relates to a method and apparatus for performing credit reservations, for online charging in a communication network.

BACKGROUND

Online charging is a process where charging information for network resource usage is collected concurrently with that resource usage, but where authorization for the resource usage is obtained by the network as a predicate to allowing the actual resource usage to occur or continue. For example, a subscriber attempts to connect to a data service through a wireless communication network and, according to online charging principles, a credit reservation is made against the subscriber account associated with the subscriber as part of the credit control that is performed before allowing the data session to be established. Further subsequent reservations may be made, as needed, to cover the costs associated with continuing the data session. Of course, the use of online charging is not limited to data services and covers event-based and session-based communications.

In a more detailed example of session-based online charging, a network subscriber requests a communication service and an "Online Charging System" or OCS initially reserves some amount of credit from the involved subscriber account. This reservation equates to some usage quota for the service, which may be expressed in terms of the resource units by which the service is metered—e.g., minutes, bytes, etc. The service is initiated based on the quota and, when the quota is used up, the session may be terminated or further credit reservations may be made against the subscriber account, assuming that sufficient credit remains available in the account to authorize additional quotas. Once the session is terminated, information about the number of resource units consumed is reported to the OCS in a final charging event.

In the context of networks based on the "Third Generation Partnership Project" or 3GPP specifications, the OCS includes an "Online Charging Function" or OCF that in turn includes distinct modules, namely a "Session Based Charging Function" or SBCF, and an "Event Based Charging Function" or EBCF. The SBCF is responsible for online charging of network/user sessions, e.g. voice calls, "Internet Protocol Connectivity Access Network" or IP CAN bearers, IP CAN sessions, and "IP Multimedia Subsystem" or IMS sessions. The EBCF performs event-based online charging, which is also referred to as "content charging", in conjunction with any application server or service network element, including Session Initiation Protocol, "SIP", application servers.

Example details regarding charging management, charging architectures and charging principles are readily available. In the above 3GPP context, see 3GPP TS 32.240 V12.6.0 (2014-12), "Technical Specification 3rd Generation Partnership Project; Technical Specification Group Services and System Aspects; Telecommunication management; Charging management; Charging architecture and principles (Release 12)".

There are a number of challenges related to online charging beyond the obvious need to reliably capture, track and charge chargeable events in the network. For example, a subscriber may be involved in multiple chargeable events involving different services. Thus, the credit reservations made against the subscriber account for initiating or continuing a given service should not be excessive, elsewise sufficient credit would not remain for authorizing other services. On the other hand, there is significant signaling associated with making credit control requests, providing corresponding credit control responses, and performing the associated account control needed to log the credit reservations against subscriber accounts. Consequently, credit reservations that are too small lead to undesirably frequent credit control transactions and higher signaling overhead.

SUMMARY

A method and apparatus advantageously consider historic usage data in determining the credit reservations made against subscriber accounts during online charging operations. In particular, with respect to a communication between first and second parties that is subject to online charging, the method and apparatus use historic usage data associated with at least one of the first and second parties, to determine credit reservations against an involved subscriber account. This approach makes the credit reservation better reflect the usage pattern or history of one or both parties. In some embodiments, the historic usage data is generalized with respect to the called or contacted party. In other embodiments, the historic usage data is generalized with respect to the calling or contacting party. In still other embodiments, the historic usage data is particularized to reflect a historic usage pattern of communication between the first and second parties.

In one embodiment, a method is implemented at a network node that is configured for operation in a communication network. The method includes obtaining historic usage data from a database, for at least one of a first party and a second party that are involved in a chargeable event in the communication network. The method further includes determining a credit reservation quantity as a function of the historic usage data. The method further includes requesting or making a credit reservation from a subscriber account according to the credit reservation quantity. Here, the subscriber account is associated with one of the first and second parties and the credit reservation is associated with initiating or continuing the chargeable event.

In another embodiment, a network node is configured for operation in a communication network and it includes one or more communication interfaces and an associated processing circuit. The processing circuit is configured to obtain historic usage data from a database that is accessible via the one or more communication interfaces. The historic usage data pertains to at least one of a first party and a second party that are involved in a chargeable event in the communication network. Further, the processing circuit is configured to determine a credit reservation quantity as a function of the historic usage data, and request or make a credit reservation from a subscriber account according to the credit reservation quantity.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
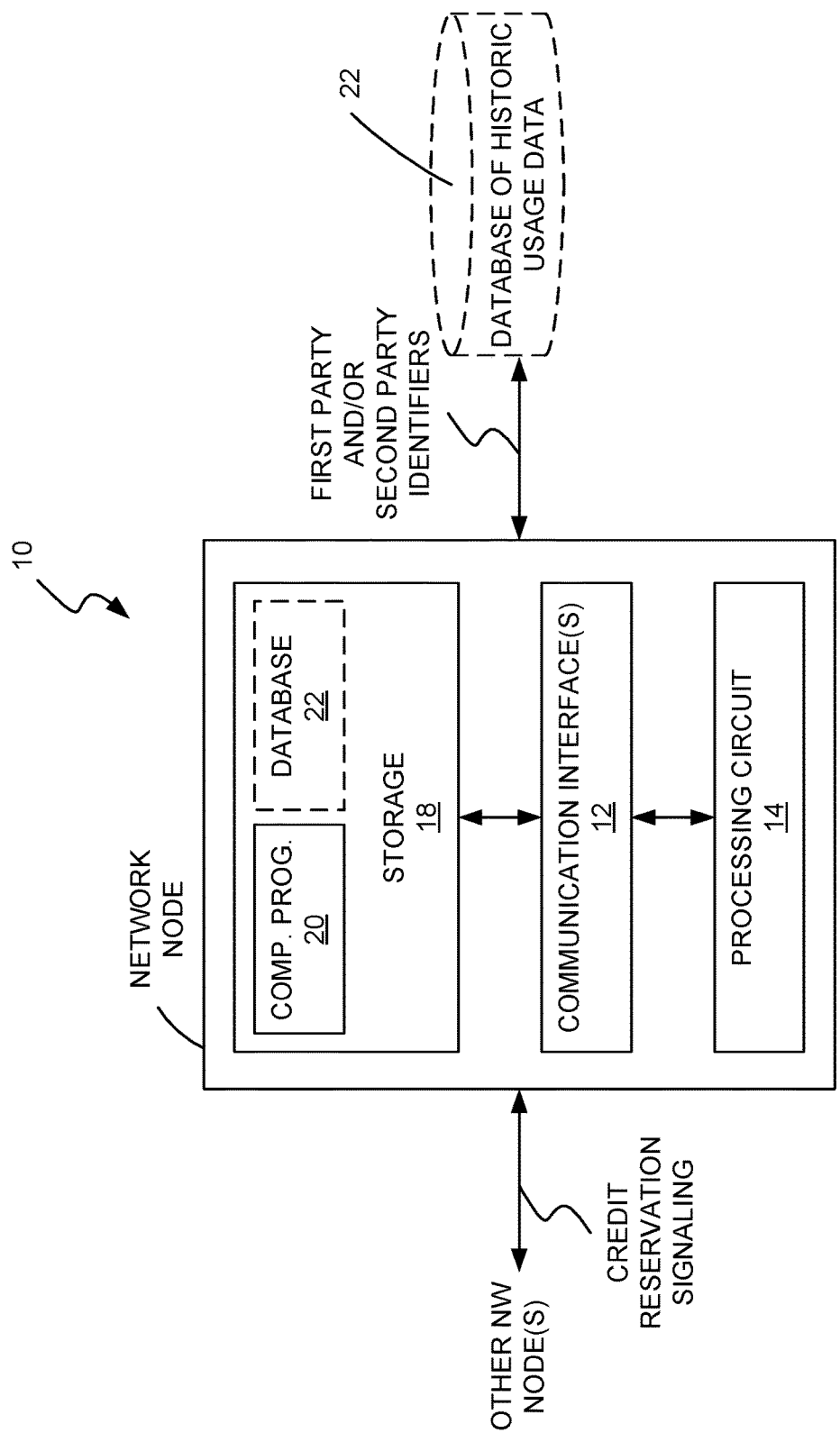
FIG. 1 is a block diagram of one embodiment of a network node configured to perform one or more online charging operations, based on historic usage data.

FIG. 1 illustrates one embodiment of a network node 10 that is configured for operation in a communication network—not shown in the figure. The network node 10 includes one or more communication interfaces 12, a processing circuit 14, and storage 18. In this example illustration, the storage 18 stores a computer program 20 and may store a database 22 of historic usage data. Additionally, or alternatively, the database 22 is maintained remotely from the network node 10. In either case, a current copy of the database 22 is accessible to the processing circuit 14 via the communication interface(s) 12, which comprise circuitry interfacing the processing circuit 14 to the storage 18 internal to the network node 10 and/or circuitry interface the processing circuit 14 to one or more other nodes, e.g., over a computer network or other communication links.

The processing circuit 14 is configured to advantageously use historic usage data from the database 22 to make improved or better-informed credit reservation decisions in the context of online charging operations. Here, the processing circuit 14 is "configured" in the sense that it comprises fixed circuitry that is designed or implemented to carry out the described functionality, or it comprises programmable circuitry that is particularly programmed or otherwise specially adapted to carry out the described functionality, or it comprises a mix of fixed and programmed circuitry.

In at least one embodiment, the processing circuit 14 includes one or more microprocessors, Digital Signal Processors or DSPs, Field programmable Gate Arrays or FPGAs, Application Specific Integrated Circuits or ASICS, or other digital processing circuitry. This digital processing circuitry is configured to execute the computer program instructions comprising the computer program 20 and such execution configures the processing circuit 14 according to the teachings herein. Correspondingly in such embodiments, the storage 18 comprises, for example, one or more memory devices or circuits, such as FLASH, EEPROM, SRAM, and/or DRAM, and is configured to provide persistent storage for the computer program 20. Here, "persistent storage" does not necessarily mean permanent storage, and the phrase encompasses updated storage, storage in working memory, e.g., for execution, etc. However, the phrase does not encompass mere propagating signals.

However implemented, the processing circuit 14 is configured to obtain historic usage data from the database 22, for at least one of a first party and a second party that are involved in a chargeable event in the communication network. In this respect, a party is "involved" in communication when, for example, the party is either the originator or target of the communication. Thus, the first and second parties may be calling and called parties, respectively, where the term "call" is used loosely to cover voice communications and non-voice communications, including various data services like packet data sessions, etc.

Further, the processing circuit 14 is configured to determine a credit reservation quantity as a function of the historic usage data, and to request or make a credit reservation from a subscriber account according to the credit reservation quantity. The credit reservation quantity is expressed, for example, in whatever units are associated with metering or tracking usage of the underlying communications. For example, the credit reservation quantity may be expressed in terms of minutes or other units of time, or in terms of bytes or other units of data volume, etc. It will be appreciated that a Rating Function, RF, or other mechanism may be used to determine monetary amounts to reserve or debit from the involved subscriber account, in accordance with the credit reservation quantity.

In that regard, the subscriber account in question is "associated" with one of the involved parties in the sense that the account is chargeable with respect to those communications. For example, the first or second party may be a subscriber of the network, and may be subject to online charging with respect to one or more types of communication activities. The credit reservations at issue here are associated with initiating or continuing chargeable events involving such subscribers. It is not necessary, however, that all parties involved in a chargeable event be subscribers of the network; indeed, one or more of the involved parties may simply be targets of the communication activities and may operate external to the network, and the network may simply serve as a gateway or link to such external parties.

Figure 2:
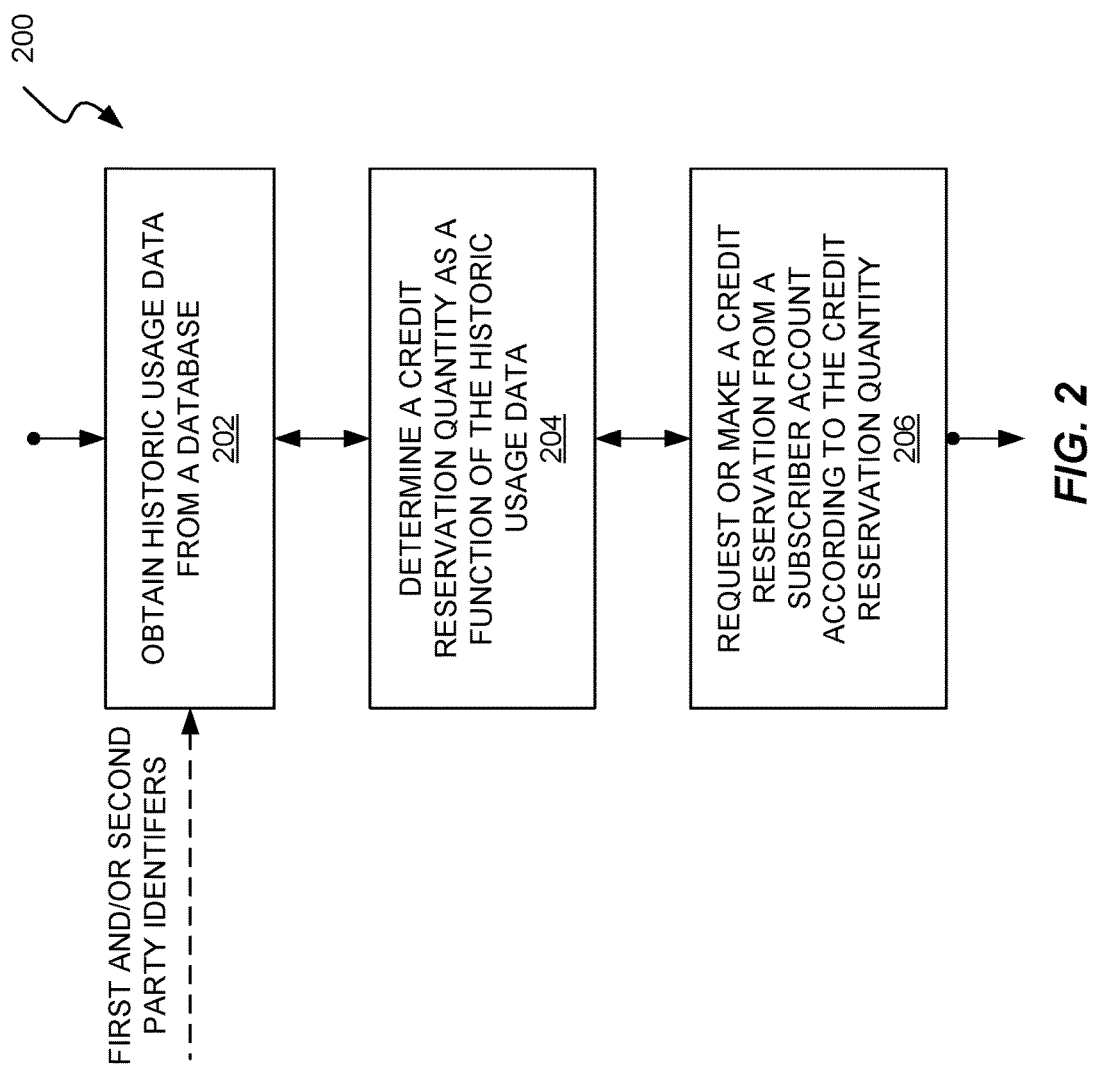
FIG. 2 is a logic flow diagram of one embodiment of a method of online charging, based on historic usage data.

FIG. 2 illustrates a method 200, which may be implemented by the network node 10. Performance of the method 200, however, is not limited to the example arrangement of node circuitry seen in the example of FIG. 1.

The method 200 includes obtaining (Block 202) historic usage data from a database 22, for at least one of a first party and a second party involved in a chargeable event in the communication network 30, and determining (Block 204) a credit reservation quantity as a function of the historic usage data.

Still further, the method 200 includes requesting or making (Block 206) a credit reservation from a subscriber account according to the credit reservation quantity. The subscriber account is associated with one of the first and second parties and the credit reservation is associated with initiating or continuing the chargeable event. For example, the method 200 may be performed initially, to authorize a communication session between the first and second parties, and may be repeated one or more times, to make further credit reservations, for continuing the communication session.

Figure 3:
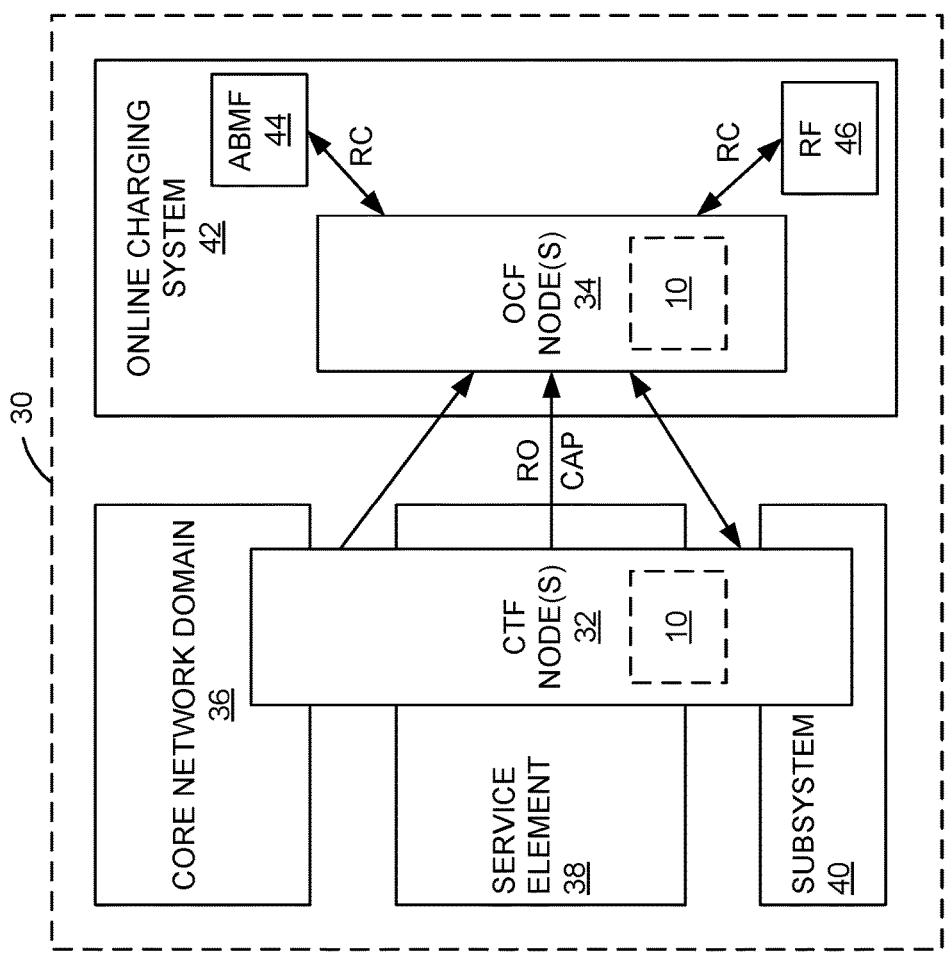
FIG. 3 is a block diagram of one embodiment of a communication network that includes one or more nodes configured to perform one or more on online charging operations, based on historic usage data.

FIG. 3 provides a useful example context for further discussing the network node 10 and the method 200, and, in particular, the figure depicts one embodiment of a communication network 30. The communication network 30—hereafter "the network 30"—includes one or more Charging Trigger Function or CTF nodes 32, and one or more Online Charging Function or OCF nodes 34. The CTF node or nodes 32 may be in any one or more portions of the network 30, such as in a Core Network or CN domain 36 of the network 30, in one or more Service Elements or SEs 38 of the network 30, or in one or more subsystems 40 of the network 30, such as an Internet Protocol Multimedia Subsystem or IMS.

The term "CTF node 32" shall be understood as denoting a node or entity in the network 30 that includes a CTF. Each such CTF node 32 receives chargeable event notifications and is configured to delay the actual resource usage until an Online Charging System or OCS 42 grants permission for such usage. In addition to one or more Online Charging Function or OCF nodes 34, the OCS 42 includes an Account Balance Management Function or ABMF 44 for managing subscriber accounts, and a Rating Function or RF 46, to determine the monetary values associated with the resource quotas on which the credit reservations are based. The term "OCF node 34" shall be understood as denoting a node or entity in the network 30/OCS 42 that includes an OCF, where said OCF performs authorization processing with respect to chargeable events and/or associated network resource usage.

Each CTF node 32 communicates with one or more OCF nodes 34—to make credit reservation requests, etc. The CTF nodes 32 also track the availability of resource usage permission during the network resource usage—i.e., during continuation of the chargeable event. This tracking is referred to as "quota supervision" and the CTF nodes 32 further enforce termination of network resource usage when permission by the OCS 42 is denied or expires.

It will be appreciated that any one or more of the CTF nodes 32 may function as the network node 10 described above. Additionally, or alternatively, one or more of the OCF nodes 34 is configured to operate as the aforementioned network node 10. When a given CTF node 32 is configured to operate as the network node 10, i.e., to determine credit reservation amounts based on historic usage data, it is not necessary for the corresponding OCF node(s) 34 to provide that functionality. On the other hand, if that functionality is provided by the OCF node(s) 34, then it is not necessary for the CTF node(s) 32 to have that functionality. Broadly, it may be that the OCF node(s) 34 are configured to provide such functionality always, or in cases where the involved CTF node(s) 32 do not provide it. Put another way, a CTF node 32 may make a credit reservation request that is based on a credit reservation quantity determined as a function of historic usage data for one or more of the parties associated with the request, or an OCF node 34 may make a credit reservation that is based on such information.

Figure 4:
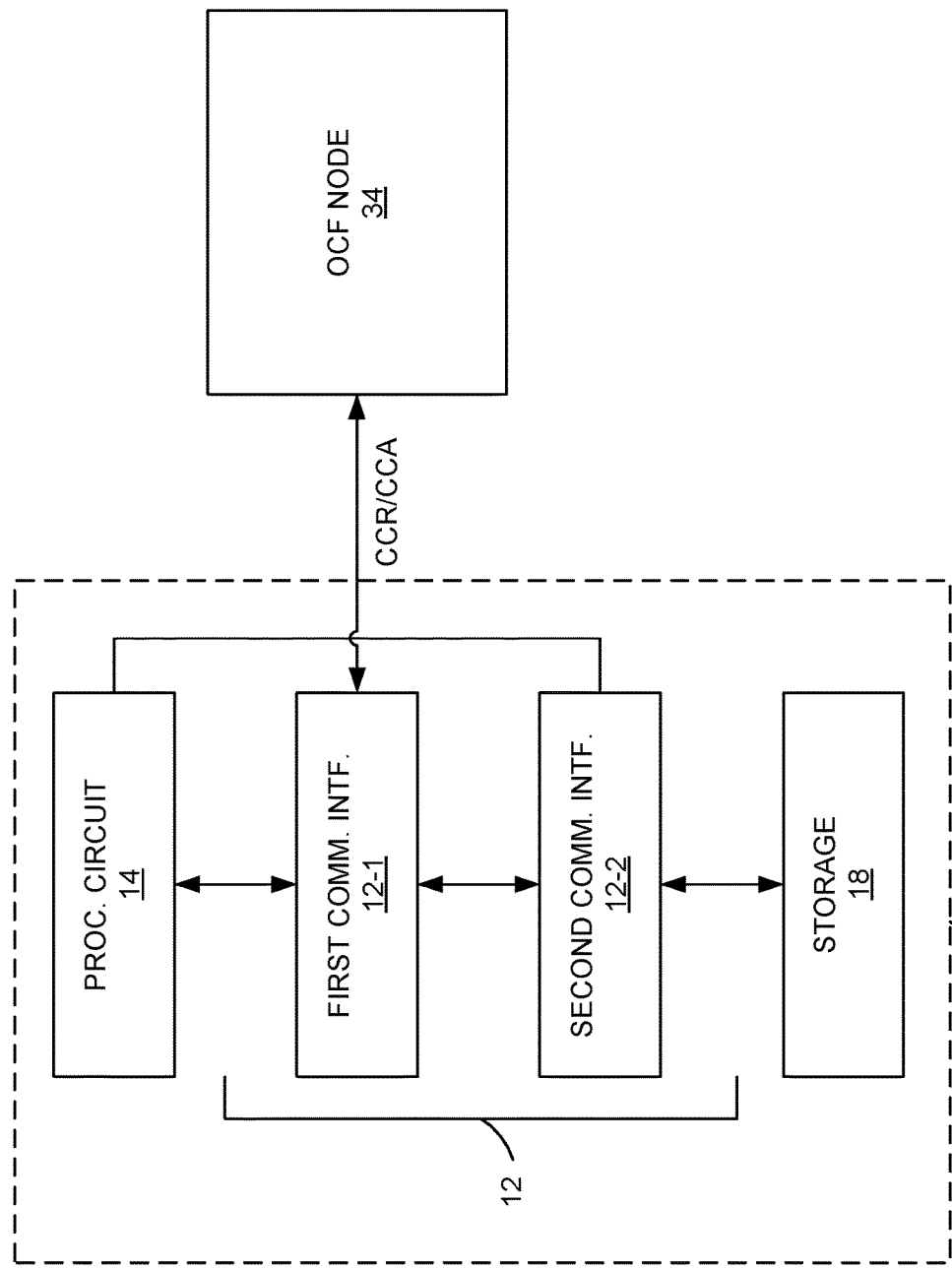
FIG. 4 is a block diagram of one embodiment of a Charging Trigger Function or CTF node that is configured to perform one or more online charging operations, based on historic usage data.

FIG. 4 illustrates an example CTF node 32 that is configured to operate as the aforementioned network node 10. Such functionality may be implemented in any one or more CTF nodes 32.

Here, the one or more communication interfaces 12 introduced in FIG. 1 include a first communication interface 12-1 to an OCF node 34, for communicating with the OCF node 34 regarding chargeable events. The first communication interface 12-1 comprises, for example, a Diameter Ro interface as described in IETF RFC 4006: Diameter Credit Control Application. Further, see 3GPP TS 32.299: Telecommunication management; Charging management; Diameter charging applications. In such examples, the first communication interface 12-1 may be used for sending Credit Control Requests, CCRs, to the OCF node 34 and for receiving Credit Control Answers, CCAs.

The CTF node 32 may further includes a second communication interface 12-2, such as internal Input/Output, I/O, circuitry that interfaces the processing circuit 14 to internal storage 18 for accessing the database 22, which is not shown in the figure. Additionally, or alternatively, the second communication interface 12-2 comprises or includes a network communication interface that couples the CTF node 32 to an external node that contains the database 22, or provides query access for the database 22.

In either case, in such embodiments, the processing circuit 14 is configured to obtain historic usage data from a database 22, for at least one of the parties involved in a chargeable event in the network 30, and to determine a credit reservation quantity as a function of the historic usage data. The processing circuit 14 is further configured to request a credit reservation from a subscriber account, according to the credit reservation quantity. Here, such requesting may be in the form of a CCR sent to a corresponding OCF node 34.

In embodiments where an OCF node 34 operates as the network node 10, the processing circuit 14 at the OCF node 34 is configured to obtain historic usage data from a database 22, for at least one of the parties involved in a chargeable event in the network 30, and to determine a credit reservation quantity as a function of the historic usage data. Further, in such embodiments, the processing circuit 14 is configured to make a credit reservation from a subscriber account, according to the credit reservation quantity. The OCF node 34 interacts with an ABMF 44 and a RF 46, for example, in conjunction with making the credit reservation.

Figure 5:
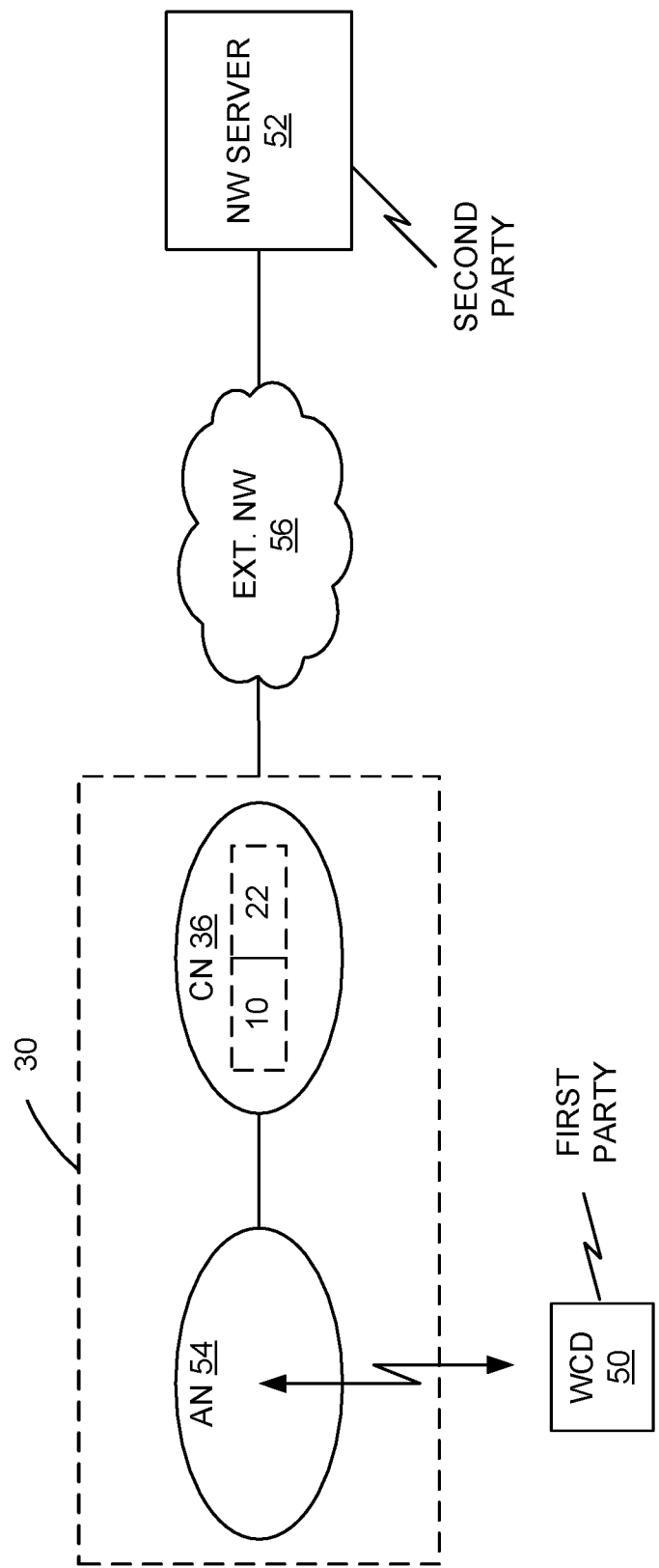
FIG. 5 is a block diagram of further example details for the network of FIG. 3.

FIG. 5 illustrates further example details for the network 30, and depicts a "first party" as a wireless communication device 50 and a "second party" as a network server 52. The network server 52 is, for example, a web server of a data service provider, such as NETFLIX, YOUTUBE, etc. The network 30 includes an Access Network or AN portion 54, to provide wireless connectivity to the wireless communication device 50. By way of example, the network 30 comprises a 3GPP-based network and the AN portion 54 comprises a cellular radio access network or WLAN. In a non-limiting example, the WLAN is based on Evolved Universal Terrestrial Radio Access Network, E-UTRAN, standards. In turn, the CN portion 36 of the network 30 includes one or more examples of the aforementioned network node 10 and database 22, and may be implemented as Evolved Packet Core or EPC.

The network 30 communicatively couples the wireless communication device 50 to the external network server 52 via one or more external networks 56, such as the Internet or another packet data network or PDN. For convenience, the wireless communication device 50 will be referred to as the first party and the network server 52 will be referred to as the second party, but these are non-limiting examples, and the teachings herein are directly applicable to communications between essentially any type of communication equipment or systems, where any such equipment is associated with a subscriber account that is subject to online charging.

Using the scenario depicted in FIG. 5 as an example, the wireless communication device 50 may be linked to a subscriber account maintained by the operator of the network 30. The subscriber account is, in turn, linked to a person or other entity that owns, rents, or otherwise controls the wireless communication device 50. The second party, being external to the network 30 may not have any particular affiliation with the network 30, or any associated subscriber account. However, use of the second party's data services by the first party, based on accessing those data services via the network 30, represents a chargeable event with respect to the subscriber account of the first party.

There may be more than one subscriber account subject to charging with respect to any given chargeable event, and it will be understood in the context of this disclosure that one or more subscriber accounts are associated with one or more of the parties involved in a chargeable event in the network 30 that is subject to online charging and credit reservation processing. In that context, historic usage data for at least one of the involved parties is advantageously used to determine credit reservation quantities, for initially authorizing and/or for continuing communications in an online charging context.

Taking the example of first and second parties involved in a communication event that is chargeable to a subscriber account controlled by the operator of the network 30, the historic usage data reflects usage statistics, patterns, or other behavior associated with at least one of the parties involved in the chargeable communication event. For an event involving a first party as a contacting party and a second party as a contacted party, the historic usage data may correspond to the first party, to the second party or to both parties. 26. The second party is, for example, a computer server of a data service provider and the historic usage data comprises historic data session information determined with respect to a number of past data sessions involving a data service of the data service provider. In other words, the historic usage data reflects the historic usage patterns or behaviors of various subscribers of the network 30 with respect to a particular data service provider and/or with respect to a particular type or brand of data service.

Thus, the historic usage data may correspond to the contacted party but may be generalized in the sense that it is not specific to any particular contacting party. Alternatively, the historic usage data may correspond to a particular contacting party but may be generalized in the sense that it is not specific to the contacted party. In another example, the historic usage data is particularized in that it reflects statistics or usage patterns or behaviors, as between the contacting and contacted party. It will be appreciated that the database 22 may contain both generalized and particularized historic usage data, and the particular historic usage data that is used to determine credit reservation quantities in any particular credit reservation operation may depend on which type or types of historical usage data are available for one or more of the parties involved in the chargeable event.

Even in cases where the historic usage data is not particularized to reflect communications between the particular contacting party and the particular contacted party, it may be compiled to reflect usage patterns organized by time of day, day of week or month, geographic location, etc. For example, the historic usage data for a given first party may indicate that the first party tends to be involved in longer communication sessions in the evening or on weekends, as compared to communication sessions that occur during the daytime on weekdays. Additionally, or alternatively, the historic usage data may be compiled to reflect usage patterns or behavior with respect to different types of communication services, such as voice calling versus data services. As an example, the usage pattern may include which communication services the subscriber has previously consumed or subscribed to. Additionally, or alternatively, the historic usage data may be compiled to reflect usage patterns associated with particular geographic locations, or with respect to particular access points and/or Radio Access Technologies, RATs, in or associated with the network.

Merely by way of example, then, consider the case where the second party is a video-on-demand service provider, or other type of multimedia content provider. The historic usage data reflects, e.g., the average session duration as historically observed for the first party with respect to the second party, or as observed for any number of subscribers of the network 30 with respect to the second party. Consider the case where the network 30 has significant information about the way in which its subscribers in general communicate with a particular second party. The network 30 can use that information to determine the credit reservation quantities made with respect to any given subscriber account associated with a subscriber of the network 30, when that subscriber contacts the second party. Such generalized information may be particularly valuable when there is no history for the particular subscriber in question.

In that regard, the network 30 may be configured to use generalized historic data when subscriber-specific data is not available, such as by accumulating generalized data not specific to any subscriber and also accumulating subscriber-specific data, which can augment or supplement the generalized data when available. Subscriber-specific data may be preferred or more heavily weighted in comparison to generalized data, and there are various mechanisms for expressing the historic usage data.

For example, in some embodiments, the historic usage data indicates any one or more of: a historical communication session duration, a historical communication session cost, and a historical communication session data volume. This data may pertain to the first party, to the second party, or to both. The data may be compiled by time, by day, by date, by location, by service type, etc.

For example, the first party is a contacting party, the second party is a contacted party, the subscriber account is associated with the contacting party, and the historic usage data comprises "generalized" historic usage data for the contacted party that is not specific to the contacting party. The term "generalized" here means that the historic usage data for the second party is not particularized with respect to the first party. Notably, historic usage data may be accumulated for a party that is not linked to any subscriber account in the network 30. For example, a popular web service might be the second party, and might be the target of many communication requests by parties that are subscribers of the network 30. In such cases, the historic usage data for the web service may be determined across any number of communication events involving the web service and various subscribers of the network 30.

In another embodiment, the first party is a contacting party, the second party is a contacted party, the subscriber account is associated with the contacting party, and the historic usage data comprises generalized historic usage data for the contacting party that is not specific to the contacted party. For example, the first party is a subscriber of the network 30 and the historic data reflects one or more usage patterns or habits of the contacting party that are not specific to the identity of the contacted party. In yet another example, the historic usage data is particularized to reflect one or more aspects of communication behavior or patterns of usage of the first party with respect to the second party, or of the second party with respect to the first party.

As noted, the historic usage data may be segregated or accumulated on service type basis, such as voice-call usage data versus data-services usage data. Further subdivisions may be made with respect to specific applications, etc.

The database 22 may comprise historical usage data for a plurality of parties, and may be indexed as a function of party identifiers. The processing circuit of the network node 10 is, in such cases, configured to obtain the historic usage data by accessing the database 22 according to one or more identifiers associated with at least one of the parties involved in a given chargeable communication event in the network 30. In an example event involving first and second parties, the processing circuit 14 is configured to access the database 22 according to a first identifier identifying the first party and according to a second identifier identifying the second party, to obtain particularized historic usage data as between the first and second parties.

In another embodiment, or simply in another use case where the first party is a contacting party and the second party is a contacted party, the processing circuit 14 is configured to access the database 22 according to a second identifier identifying the second party, to obtain generalized historic usage data for the second party. Of course, the particular nature of the historic data used and the particular party or parties for which such data is obtained may dynamically change in dependence on the identity of the parties involved in a given chargeable event and/or in dependence on the nature or the extent of the historic usage data that is available for any one or more of the involved parties.

Consider, too, an example case where the database 22 organizes historical usage data for a plurality of parties by device identifiers and/or network addresses. Correspondingly, the processing circuit 14 is configured to obtain the historical usage data by accessing the database 22 using a device identifier and/or network address associated with at least one of the parties involved in a chargeable communication event. This access provides the processing circuit 14 with a more informed basis on which to determine the credit reservation quantity, for making or requesting a credit reservation in association with authorizing or continuing communications between the parties. The reservation may be an initial reservation for initially authorizing communications, or a subsequent reservation for continuing the communications.

Figure 6:
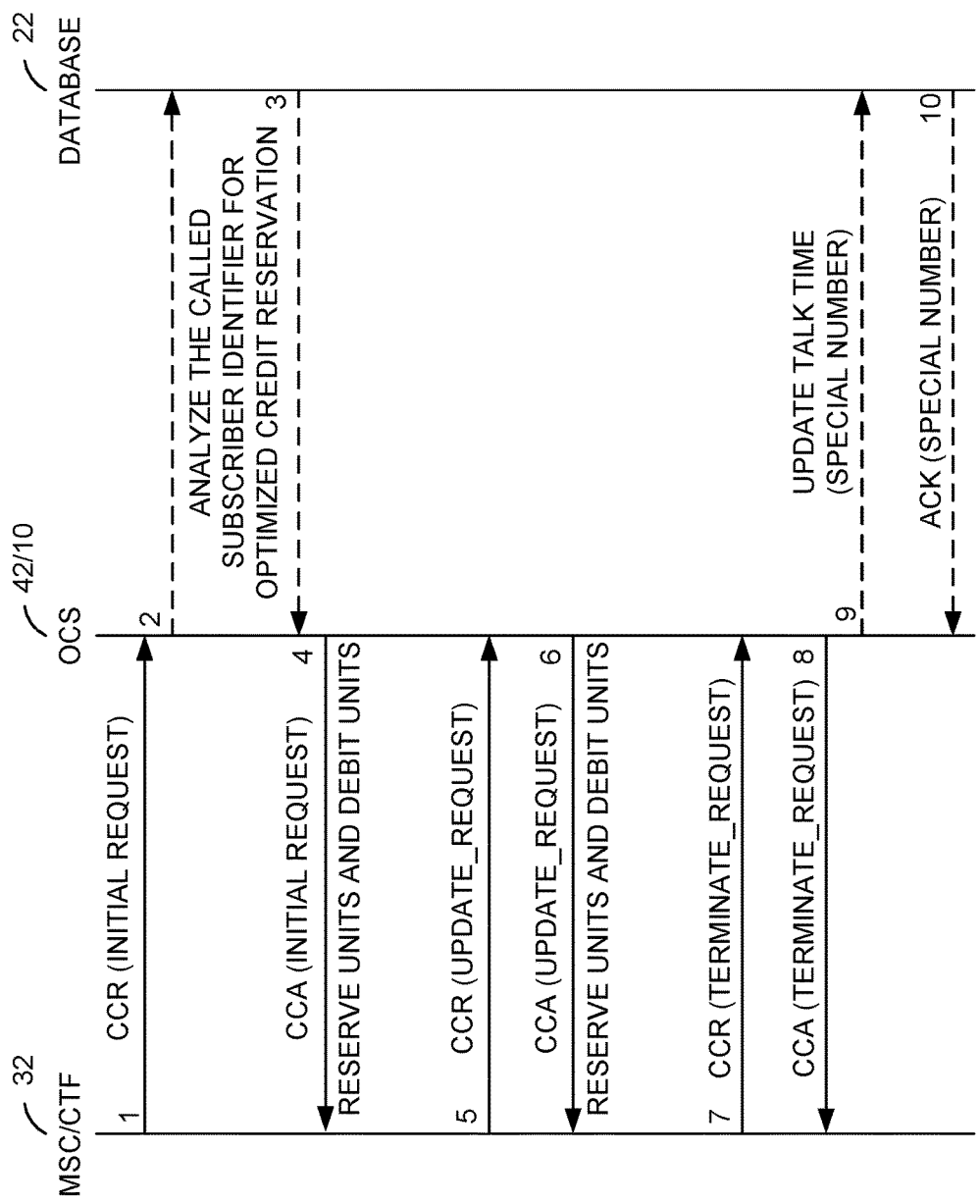
FIGS. 6-9 are signal flow diagrams of example embodiments of online charging based on historic usage data.

Consider the example signal or processing flow illustrated in FIG. 6. Here, one may assume that the chargeable event is an initial attempt by a first party to call a second party—i.e., the first party is the contacting or calling party and the second party is the contacted or called party. One may further assume that both parties are associated with or represented by wireless communication devices 50 or other such identifiable communication equipment.

The CTF node 32 is embodied in or associated with a Mobile Switching Center or MSC, and it sends (Step 1) an initial Credit Control Request or CCR towards an OCS 42 that is implemented with an example of the network node 10. That is, an OCF node 34 in the OCS 42 operates as the network node 10 in that the OCF node 34 makes credit reservations in dependence on historic usage data.

In particular, the OCS 42 analyzes (Step 2) a subscriber identifier, e.g., a Mobile Station International Subscriber Directory Number or MSISDN, of the called party, and uses that identifier to access the database 22, to obtain relevant historic usage data (Step 3). The historic usage data may be particularized with respect to the calling party or it may be generally applicable for the called party.

In any case, the OCS 42 determines an initial credit reservation quantity based on the historic usage data and uses that determined credit reservation quantity to make a corresponding credit reservation from one or more subscriber accounts, e.g., a subscriber account that is associated with the calling or called party. The OCS 42 returns an initial CCA (Step 4) and unit reservation and debiting occurs. To the extent that the underlying communications continue and require further credit reservation, the CTF node 32 sends one or more further CCRs and the OCS 42 responds with one or more further CCAs (Steps 5 and 6). A final CCR and CCA are exchanged upon termination of the underlying communications (Steps 7 and 8).

Any such intermediate CCA/CCR may be based on the historic usage data but may be refined in terms of the ongoing usage. For example, consider a case where the underlying communication service is a multimedia content delivery service. The historic usage data may indicate that the calling party generally remains connected for at least a half-hour, and may further indicate that, in cases where the communications extend beyond a half-hour, the session is likely to last for an hour.

Further, the OCS 42 may update the historic usage data at the conclusion of the communications, e.g., by sending a "talk time" or other indication of the duration of the communications (Step 9), for example as a usage record. The database 22 may use such information to update the historic usage data that it stores for the called party, the calling party, or both (Step 10). Updating here may comprise, for example, updating a filtered or average value. Similarly updating may be performed in cases where the resource units in question are bytes or other measures of data volume. In general, it will be appreciated that a network node 10 as taught herein is, in one or more embodiments, configured to update a database 22, based on observing or obtaining actual usage behavior information for a given party. Consequently, the historic usage data stored in the database 22 for that given party is initialized, accumulated, refined, or otherwise updated over time, based on the actual usage behavior.

Figure 7:
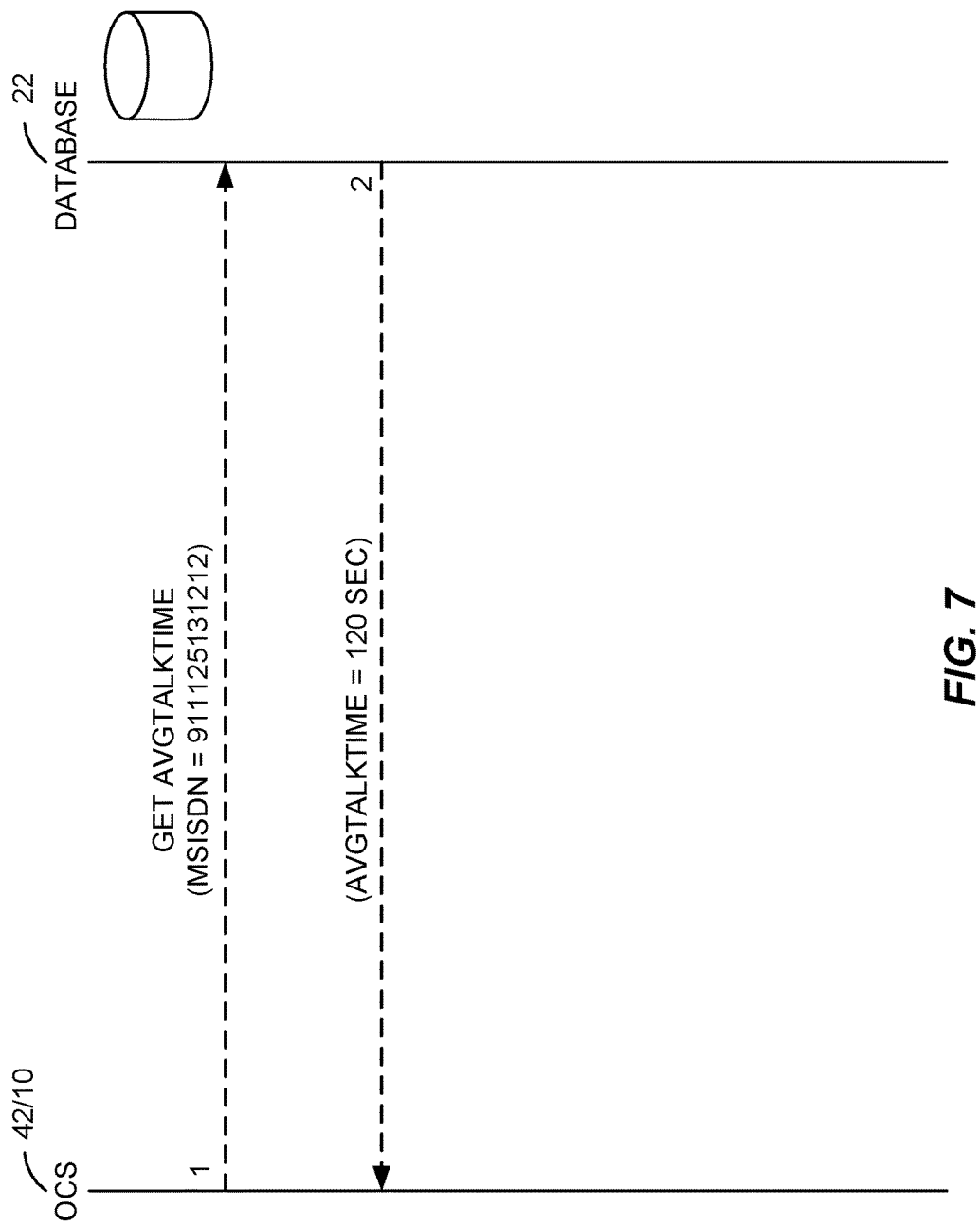

While not a limiting example, average talk time represents a useful parameter for storing as the historic usage data. See, e.g., FIG. 7, which shows an OCS 42 using the MSISDN of the calling or called party to obtain historic usage data from the database 22. In the particular example, the average talk time value returned is 120 seconds, meaning that the OCS 42 can make a well informed initial credit reservation, based on knowing that the historical average talk time for calls involving this particular calling party, or this particular called party, last an average of 120 seconds. Of course, MSISDNs are not the only form of identifier that can be used in this manner For example, the database 22 may store average talk times in association with particular phone numbers, such as special phone numbers that are frequently called—e.g., the numbers used by a large corporation or governmental entity for technical support, reservations, orders, etc.

Figure 8:
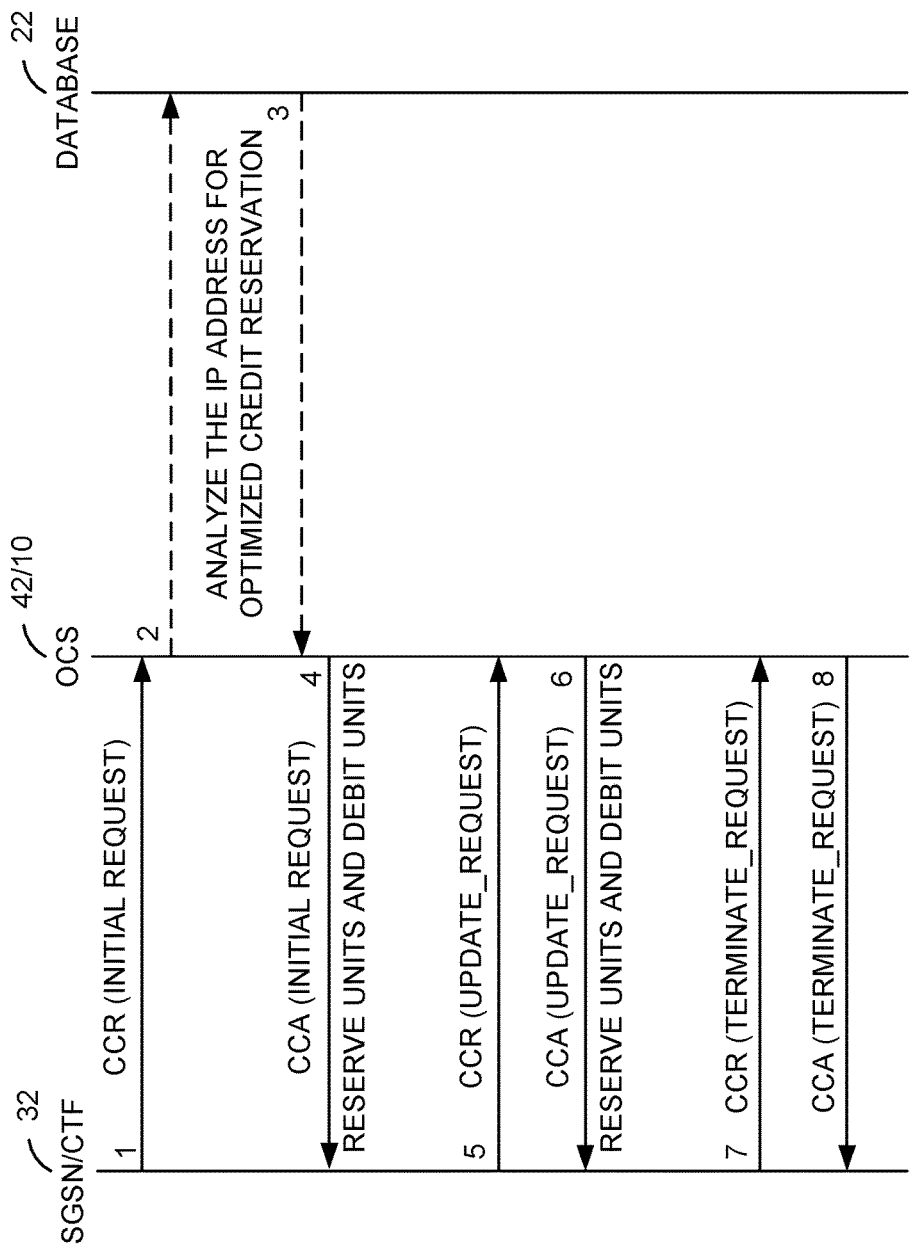

FIG. 8 illustrates another example signal flow, wherein a CTF node 32 is embodied in a Serving GPRS Support Node or SGSN within the network 30, and sends (Step 1) an initial CCR towards an OCS 42 that is configured according to the teachings herein. In particular, the OCS 42 uses the IP address of the calling or called party to access the database 22 and thereby obtain historic usage data associated with that IP address (Steps 2 and 3).

The OCS 42 correspondingly makes an "optimized" credit reservation, based on the historic usage data. The reservation is optimized in the sense that it reflects historic usage patterns or behavior for communications involving the IP address or addresses involved in the chargeable event. The OCS 42 makes a credit reservation based on that determined credit reservation quantity and the credit reservation information is returned to the SGSN/CTF node 32 in an initial CCA (Step 4), for unit reservation. Steps 5-8 involve subsequent intermediate CCRs and CCAs, as needed, followed by a terminating CCR and CCA, at the conclusion of the communications.

Figure 9:
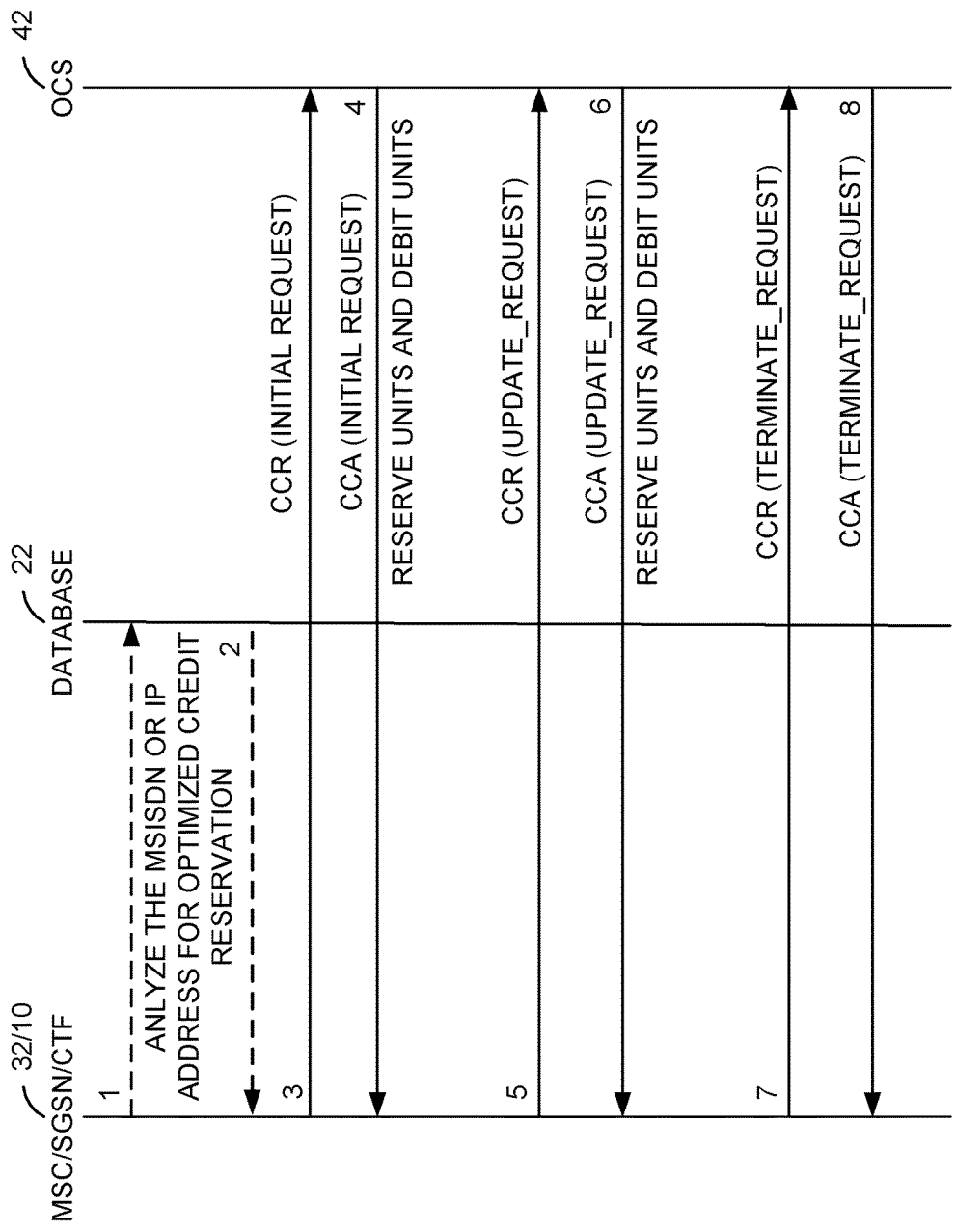

Steps 1-9 in FIG. 9 are similar to those seen in FIG. 8, with the exception that here the involved CTF node 32, which may be associated with an MSC or SGSN in the network 30, is the entity that performs the credit reservation quantity determination, rather than the OCS 42. The CTF node 32 in this example case uses the IP address of the called or calling party to access the database 22, to obtain relevant historic usage data. Correspondingly, the CTF node 32 determines the initial credit reservation quantity based on the historic usage data and includes that determined quantity or a corresponding value, in the initial CCR sent to the OCS 42.

Figure 10:
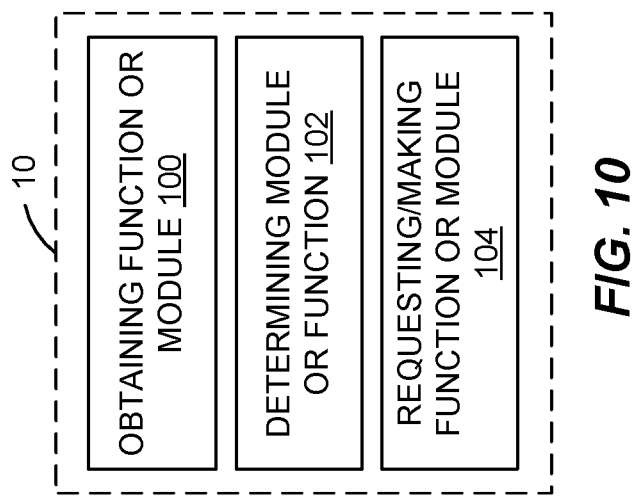
FIG. 10 is a block diagram of another embodiment of a network node configured to request or make credit reservations, based on historic usage data.

Notably, modifications and other embodiments of the disclosed invention(s) will come to mind to one skilled in the art having the benefit of the teachings presented in the foregoing descriptions and the associated drawings. For example, FIG. 10 illustrates yet another embodiment of the network node 10. In particular, FIG. 10 illustrates a number of functions or modules 100, 102 and 104. These modules may be implemented in the network node 10 in computer processing circuitry, for example, based on the execution of stored computer program instructions.

In any case, in the illustrated example, the network node 10 comprises an obtaining module 100, for obtaining historic usage data from a database, for at least one of a first party and a second party involved in a chargeable event in the communication network 30. The network node 10 further includes a determining function or module 102, for determining a credit reservation quantity as a function of the historic usage data, and a requesting/making module 104, for requesting or making a credit reservation from a subscriber account according to the credit reservation quantity. It will be appreciated that various means for implementing these modules may be used, including the advantageous circuit arrangements illustrated in the examples given in this disclosure.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a network node configured for operation in a communication network, the method comprising:
    obtaining historic usage data from a database, for at least one of a first party and a second party involved in a chargeable event in the communication network, wherein the first party is a contacting party and the second party is a contacted party in the context of the chargeable event, wherein the historic usage data indicates, for at least one of the first party and the second party, any one or more of: a historical communication session duration, a historical communication session cost, and a historical communication session data volume, and the historic usage data comprises generalized historic usage data for at least one of: the contacted party that is not specific to the contacting party and the contacting party that is not specific to the contacted party;
    determining a credit reservation quantity as a function of the generalized historic usage data; and
    requesting or making a credit reservation from a subscriber account according to the credit reservation quantity, the subscriber account being associated with the contacting party and the credit reservation being associated with initiating or continuing the chargeable event.

2. The method of claim 1, wherein the network node comprises a Charging Trigger Function, CTF, node, and wherein the step of requesting or making the credit reservation comprises requesting the credit reservation by sending a Credit Control Request, CCR, to an Online Charging Function, OCF, node.

3. The method of claim 1, wherein the network node comprises an Online Charging Function, OCF, node, and wherein the step of requesting or making the credit reservation comprises making the credit reservation from the subscriber account.

4. The method of claim 1, wherein the historic usage data comprises generalized historic usage data for the contacted party that is not specific to the contacting party.

5. The method of claim 1, wherein the historic usage data comprises generalized historic usage data for the contacting party that is not specific to the contacted party.

6. A method at a network node configured for operation in a communication network, the method comprising:
    obtaining historic usage data from a database, for at least one of a first party and a second party involved in a chargeable event in the communication network, wherein the historic usage data indicates, for at least one of the first party and the second party, any one or more of: a historical communication session duration, a historical communication session cost, and a historical communication session data volume, wherein the historical usage data comprises particularized historic usage data as between the first and second parties, wherein the database comprises historical usage data for a plurality of parties, indexed as a function of party identifiers, and wherein obtaining the historic usage data comprises accessing the database according to one or more identifiers associated with at least one of the first party and the second party;
    determining a credit reservation quantity as a function of the particularized historic usage data; and
    requesting or making a credit reservation from a subscriber account according to the credit reservation quantity, the subscriber account being associated with one of the first and second parties and the credit reservation being associated with initiating or continuing the chargeable event.

7. The method of claim 6, wherein accessing the database according to one or more identifiers associated with at least one of the first party and the second party comprises accessing the database according to a first identifier identifying the first party and according to a second identifier identifying the second party, to obtain particularized historic usage data as between the first and second parties.

8. The method of claim 6, wherein the first party is a contacting party and the second party is a contacted party, in the context of the chargeable event, and wherein accessing the database according to one or more identifiers associated with at least one of the first party and the second party comprises accessing the database according to a second identifier identifying the second party, to obtain generalized historic usage data for the second party.

9. The method of claim 1, wherein obtaining the historical usage data comprises accessing the database using a device identifier and/or network address associated with at least one of the first party and the second party, and wherein the database organizes historical usage data for a plurality of parties by device identifiers and/or network addresses.

10. The method of claim 1, wherein requesting or making the credit reservation from the subscriber account comprises requesting or making an initial credit reservation from the subscriber account, for initiating the chargeable event.

11. The method of claim 1, wherein the second party is a computer server of a data service provider and wherein the historic usage data comprises historic data session information determined with respect to a number of past data sessions involving a data service of the data service provider.

12. A network node configured for operation in a communication network, the network node comprising one or more communication interfaces and an associated processing circuit configured to:
  obtain historic usage data from a database that is accessible via the one or more communication interfaces, for at least one of a first party and a second party involved in a chargeable event in the communication network, wherein the first party is a contacting party and the second party is a contacted party in the context of the chargeable event, wherein the historic usage data indicates, for at least one of the first party and the second party, any one or more of: a historical communication session duration, a historical communication session cost, and a historical communication session data volume, and the historic usage data comprises generalized historic usage data for at least one of: the contacted party that is not specific to the contacting party and the contacting party that is not specific to the contacted party;
  determine a credit reservation quantity as a function of the generalized historic usage data; and
  request or make a credit reservation from a subscriber account according to the credit reservation quantity, the subscriber account being associated with one of the first and second parties and the credit reservation being associated with initiating or continuing the chargeable event.

13. The network node of claim 12, wherein the network node comprises a Charging Trigger Function, CTF, node, and wherein
  the one or more communication interfaces include a first communication interface between the CTF node and an Online Charging Function, OCF, node, and
  the processing circuit is configured to request the credit reservation by sending, via the first communication interface, a Credit Control Request, CCR, to the OCF node.

14. The network node of claim 12, wherein the network node comprises an Online Charging Function, OCF, node, and wherein the processing circuit is configured to make the credit reservation from the subscriber account.

15. The network node of claim 12, wherein the historic usage data comprises generalized historic usage data for the contacted party that is not specific to the contacting party.

16. The network node of claim 12, wherein the historic usage data comprises generalized historic usage data for the contacting party that is not specific to the contacted party.

17. The network node of claim 12, wherein the historic usage data further comprises particularized historic usage data as between the first and second parties.

18. A network node configured for operation in a communication network, the network node comprising one or more communication interfaces and an associated processing circuit configured to:
  obtain historic usage data from a database that is accessible via the one or more communication interfaces, for at least one of a first party and a second party involved in a chargeable event in the communication network, wherein the database comprises historical usage data for a plurality of parties, indexed as a function of party identifiers, and wherein the processing circuit is configured to obtain the historic usage data by accessing the database according to one or more identifiers associated with at least one of the first party and the second party;
  determine a credit reservation quantity as a function of the historic usage data; and
  request or make a credit reservation from a subscriber account according to the credit reservation quantity, the subscriber account being associated with one of the first and second parties and the credit reservation being associated with initiating or continuing the chargeable event.

19. The network node of claim 18, wherein the processing circuit is configured to access the database according to a first identifier identifying the first party and according to a second identifier identifying the second party, to obtain, as said historic usage data, particularized historic usage data as between the first and second parties.

20. The network node of claim 18, wherein the first party is a contacting party and the second party is a contacted party, in the context of the chargeable event, and wherein the processing circuit is configured to access the database according to a second identifier identifying the second party, to obtain, as said historic usage data, generalized historic usage data for the second party.

21. The network node of claim 12, wherein the processing circuit is configured to obtain the historical usage data by accessing the database using a device identifier and/or network address associated with at least one of the first party and the second party, and wherein the database organizes historical usage data for a plurality of parties by device identifiers and/or network addresses.

22. The network node of claim 12, wherein the processing circuit is configured to request or make the credit reservation from the subscriber account as an initial credit reservation from the subscriber account, for initiating the chargeable event.

23. The network node of claim 12, wherein the second party is a computer server of a data service provider and wherein the historic usage data comprises historic data session information determined with respect to a number of past data sessions involving a data service of the data service provider.

* * * * *